United States Patent

Yamada et al.

Patent Number: 6,109,879
Date of Patent: Aug. 29, 2000

[54] FLUID PRESSURE SOURCE APPARATUS

[75] Inventors: Satoshi Yamada, Anjo; Hiroshi Nakashima, Nishio; Shinsuke Sakane, Chita-gun, all of Japan

[73] Assignee: Aisin Seiki Kabushiki Kaisha, Kariya, Japan

[21] Appl. No.: 08/975,356

[22] Filed: Nov. 20, 1997

[30] Foreign Application Priority Data

Nov. 20, 1996 [JP] Japan .................................. 8-309683

[51] Int. Cl.⁷ .................................................. F04B 49/02
[52] U.S. Cl. .......................... 417/38; 417/44.1; 303/10; 303/122.12; 303/122.13; 303/DIG. 11
[58] Field of Search .................................. 417/38, 44.11; 303/DIG. 11, 10, 122.12, 122.13

[56] References Cited

U.S. PATENT DOCUMENTS

| 5,927,832 | 7/1999 | Fulks et al. .............................. 303/167 |
| 5,934,880 | 8/1999 | Yamada et al. ............................ 417/38 |
| 5,957,549 | 9/1999 | Nagai et al. ........................ 303/122.12 |

*Primary Examiner*—Timothy S. Thorpe
*Assistant Examiner*—Ehud Gartenberg
*Attorney, Agent, or Firm*—Burns, Doane, Swecker & Mathis, LLP

[57] ABSTRACT

A fluid pressure source apparatus includes a pump, an accumulator for receiving pressure from the pump, a pressure switch for detecting the pressure in the accumulator, an electric motor for driving the pump, and a motor control device for driving the motor when the pressure switch detects a low pressure. A current detecting device detects a motor current value of the motor and a control unit determines whether the accumulator or the motor is experiencing an abnormality based on the motor current value. The control unit determines whether the motor current value occurring during a first set time following the start of driving of the motor is greater than a first set value. If the motor current value is not greater than the first set value, the control unit determines that the current detecting device is experiencing an abnormality. If there is no such abnormality information, the control unit compares the motor current value with predetermined values. If the motor current value continues to be less than a lower limit value for at least a predetermined length of time, the control unit determines that there is a low pressure abnormality. If the motor current value continues to be greater than an upper limit value for at least a predetermined length of time, the control unit determines that there is a motor lock abnormality.

11 Claims, 7 Drawing Sheets

FLUID PRESSURE SOURCE APPARATUS

FIELD OF THE INVENTION

The present invention generally relates to a fluid pressure source that accumulates pressure in an accumulator using a fluid pump driven by an electric motor and that provides pressure fluid from the accumulator to a fluid circuit, wherein the electric motor is driven to maintain the accumulator pressure within a set range. More particularly, the present invention pertains to such a fluid pressure source that is usable, for example, as a brake pressure source of a brake circuit for supplying a brake pressure to wheel brakes of a vehicle, as a hydraulic booster for supplying a brake pressure to wheel brakes of a vehicle, or as a high pressure source of a hydraulic circuit for supplying a vehicle suspension with pressure for supporting the vehicle.

BACKGROUND OF THE INVENTION

A vehicle equipped with a hydraulic booster (HB) and an anti-block brake system (ABS) in the wheel braking system or a vehicle equipped with an active suspension system has a fluid pressure source apparatus which supplies an operating pressure (high pressure). The fluid pump of the fluid pressure source apparatus is driven by an electric motor or a vehicle engine via a clutch.

A conventional fluid pressure source apparatus is disclosed in U.S. Pat. No. 5,221,125. The apparatus disclosed in this document is designed so that fluid from a reservoir is pressurized by a fluid pump driven by a motor and thereby discharged into a high pressure line. An accumulator is connected to the high pressure line to accumulate fluid pressure discharged by the pump.

A high pressure-side pressure switch and a low pressure-side pressure switch are connected to the high pressure line. Pressure detection signals generated by the pressure switches are inputted to an electronic control unit. Both the pressure switches have hysteresis characteristics. When the pressure detection signal indication from the high pressure-side pressure switch turns from high pressure to low pressure, the electronic control unit drives the fluid pump (through the electric motor). When the pressure detection signal indication from the high pressure-side pressure switch turns from low pressure to high pressure, the electronic control unit stops driving the fluid pump. Because the pressure (normal lower limit pressure) at which the indication of the pressure detection signal from high pressure to low pressure is lower than the pressure (normal upper limit pressure) at which the indication of the signal turns from low pressure to high pressure, the pressure in the accumulator is maintained between the normal lower limit pressure and the normal upper limit pressure.

The low pressure-side pressure switch is used to detect an excessive or abnormal drop of the pressure in the accumulator. If the pressure in the accumulator falls to a level (abnormal lower limit pressure) that is lower than the normal lower limit pressure, the low pressure-side pressure switch generates a pressure detection signal indicating "low pressure", whereupon the electronic control unit outputs a warning.

A current detection circuit can also be provided for detecting the value of the current fed to the electric motor. For example, it can be determined whether or not the accumulator and/or the electric motor is experiencing an abnormality based on the value of the current fed to the electric motor. In this case, the abnormality of the accumulator and/or the electric motor cannot be accurately determined if the current detection circuit is experiencing an abnormality. Therefore, it is necessary to be able to determine the existence of an abnormality in the current detection circuit.

SUMMARY OF THE INVENTION

In light of the foregoing, a need exists for a vehicle motion control system which addresses at least the foregoing drawbacks in other known systems.

The fluid pressure source apparatus of the present invention is usable, for example, as a brake pressure source of a brake circuit for supplying a brake pressure to wheel brakes of a vehicle, as a hydraulic booster for supplying a brake pressure to wheel brakes of a vehicle, and/or as a high pressure source in a hydraulic circuit for supplying a vehicle suspension with a pressure for supporting the vehicle.

According to an aspect of the invention, a fluid pressure source apparatus including a fluid pump, an accumulator which receives pressure from the fluid pump, a pressure switch for detecting pressure in the accumulator, an electric motor for driving the fluid pump, and a motor control device for driving the electric motor when the pressure switch detects a low pressure. A current detection device is provided for detecting a value of current of the electric motor. An abnormality determination device determines whether one or both of the accumulator and the electric motor is experiencing an abnormality based on the motor current value of the electric motor. A failure determination device determines whether the motor current value of the electric motor occurring during a first set length of time following the start of driving of the electric motor is greater than a first set value. If the value of current is not greater than the first set value, the failure determination device determines that the current detection device is experiencing an abnormality.

When the pressure switch detects low pressure, the motor control device turns on the electric motor to drive the fluid pump so that the pressure in the accumulator increases. When the pressure switch detects high pressure, the motor control device stops driving the electric motor. The pressure detection signal from the pressure switch switches from a low level which indicates high pressure to a high level which indicates low pressure when the accumulator pressure decreases to a first pressure. The pressure detection signal switches from the high level to the low level L when the accumulator pressure rises to a second pressure greater than the first pressure.

The motor current detection device detects the electric current that flows in the electric motor, and the abnormality determination device uses the detected motor current as a basis for determining an abnormality. If the motor current value is abnormal, the abnormality determination device determines that one or both of the accumulator and the electric motor is experiencing an abnormality. For example, the abnormality determination device may determine that there is a motor lock abnormality if an excessively great motor current continues to flow for at least a predetermined length of time, and the abnormality determination device may determine that there is an accumulator low pressure abnormality or a motor racing abnormality if an excessively small motor current continues to flow for at least another predetermined length of time.

According to another aspect of the invention, a fluid pressure source apparatus includes a fluid pump, an accumulator for receiving fluid pressure from the fluid pump, a pressure switch for detecting pressure in the accumulator, an electric motor for driving the fluid pump, a relay driver for energizing the electric motor, and a motor current detection device for detecting the motor current value of the electric motor. A failure determination device determines whether the motor current value of the electric motor during a first set length of time following start of driving of the electric motor is greater than a first set value, and generates circuit abnormality information if the motor current value of the electric motor is not greater than the first set value. A motor control device drives the electric motor using the relay driver when the pressure switch detects low pressure and stops driving the electric motor if the motor current value of the electric motor reaches a second set value while the circuit abnormality information is not generated.

In accordance with another aspect of the invention a fluid pressure source apparatus includes a fluid pump, an accumulator for receiving fluid pressure from the fluid pump, a pressure switch for detecting pressure in the accumulator, an electric motor for driving the fluid pump, and a motor control device for driving the electric motor when the pressure switch detects low pressure in the accumulator and for stopping driving of the electric motor when the pressure switch detects high pressure in the accumulator. A current detection device detects a motor current value of the electric motor, and an abnormality determination device determines the existence of an abnormality in either the accumulator or the electric motor based on the motor current value determined by the current detection means. A failure determination device determines the existence of an abnormality in the current detection means.

BRIEF DESCRIPTION OF THE DRAWING FIGURES

The foregoing and additional details of the present invention will become more apparent from the following detailed description considered with reference to the accompanying drawing figures in which like elements are designated by like reference numerals and wherein.

DETAILED DESCRIPTION OF THE INVENTION

Figure 1:
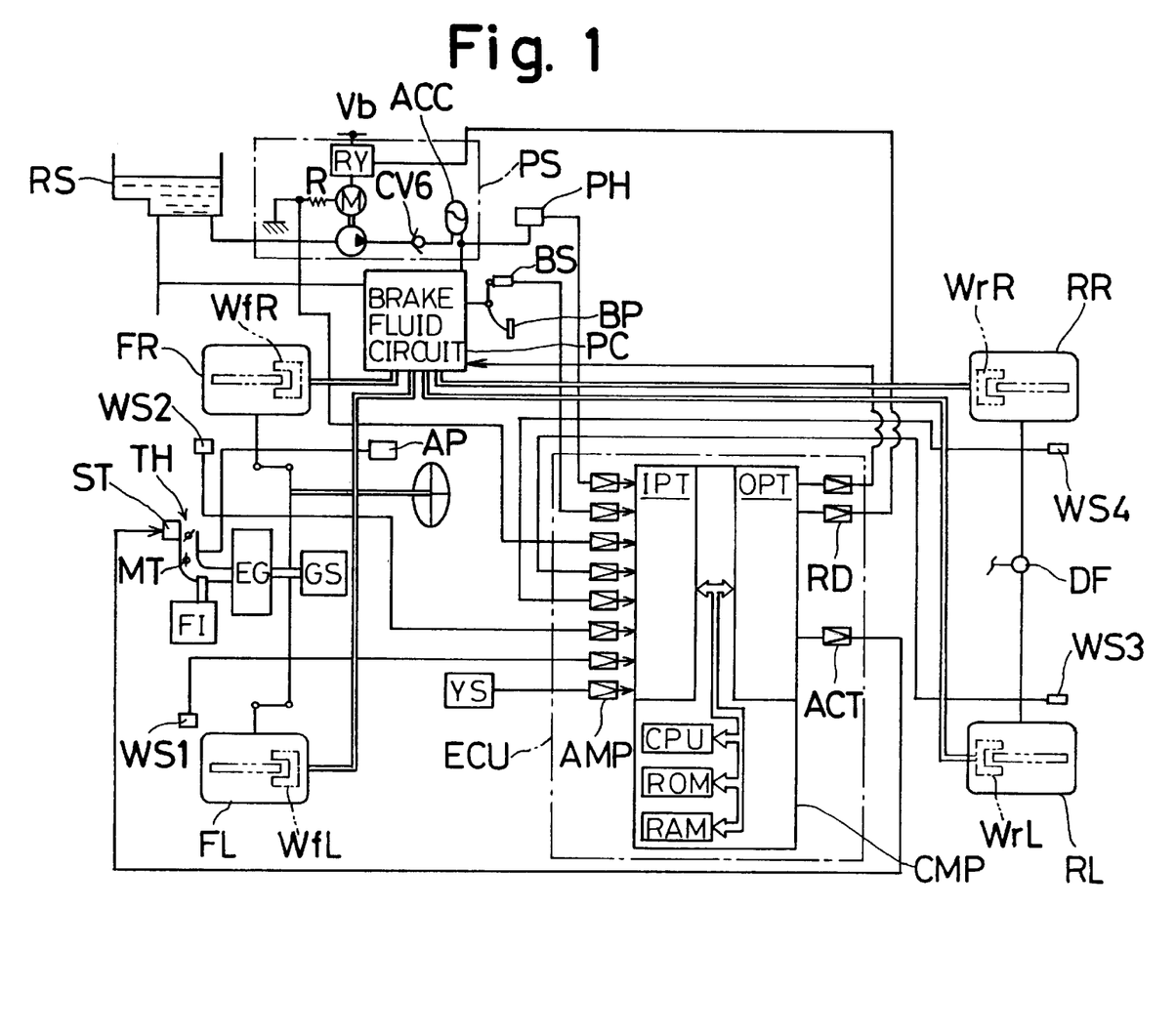
FIG. 1 is a schematic illustration of the wheel brake pressure control apparatus according to the present invention.

FIG. 1 illustrates the overall construction of a vehicle-installed wheel brake pressure control apparatus incorporating a fluid pressure source apparatus according to the present invention. An engine EG in the form of an internal combustion engine is equipped with a throttle control device TH and a fuel injection device FI. The throttle control device TH controls the opening of a main throttle valve MT in accordance with the operation of an accelerator pedal AP.

A sub-throttle valve ST of the throttle control device TH is driven in accordance with the output from an electronic control unit ECU so that the opening of the sub-throttle valve ST is controlled. The fuel injection device FI is simultaneously driven in accordance with the output from the electronic control unit ECU to thereby control the amount of fuel that is injected. The engine EG is connected to the rear vehicle wheels RL, RR via a gear speed shift control GS and a differential gear unit DF.

Wheel cylinders WfL, WfR, WrL, WrR associated with the wheel brakes are disposed in the corresponding wheels FL, FR, RL, RR. The wheel cylinders WfL, WfR, WrL, WrR are connected to a brake fluid pressure circuit PC. The wheel FL is a front left wheel as viewed from the driver's seat; the wheel FR is a front right wheel as viewed from the driver's seat, the wheel RL is a rear left wheel as viewed from the driver's seat, and the wheel RR is a rear right wheel as viewed from the driver's seat.

Each of the wheels FL, FR, RL, RR is equipped with a respective pulse generator WS1–WS4 which generates an electric signal pulse for every predetermined small rotational angle of each wheel. The electric signal pulses from the pulse generators WS1–WS4 are inputted to the electronic control unit ECU. A microcomputer CMP of the electronic control unit ECU performs an interrupt processing in response to each pulse inputted from, for example, the pulse generator WS1, to write the value of the presently measured time (clock pulse count value) into a pulse interval register for the pulse generator WS1 and restart the counting of clock pulses. Thus, the pulse interval register for the pulse generator WS1 always holds data that indicates the latest interval of pulses generated by the pulse generator WS1. To determine the rotational speed VwfL of the wheel FL, the microcomputer CMP multiplies the inversion of a value indicated by the data written in the pulse interval register for the pulse generator WS1 by a proportionality factor. Substantially the same type of interrupt processing is performed for pulses generated by the other pulse generators WS2, WS3, WS4, so that the rotational speeds VwfR, VwrL, VwrR of the wheels FR, RL, RR are calculated in a similar manner.

The microcomputer CMP of the electronic control unit ECU includes, among other features, a microprocessor (CPU), a read-only memory (ROM), a random-access memory (RAM), input ports IPT, and output ports OPT as shown in FIG. 1.

A variety of output signals are inputted, via amplifiers AMP, to respective input ports IPT, and then to the A/D converting ports of the microprocessor CPU. These output signals include output signals from a brake switch BS that turns on when a brake pedal BP is depressed, output signals from a pressure switch PH for detecting a high level and a low level of the pressure output from an accumulator, an output signal indicating the electric current in the motor M that drives a fluid pressure pump, output signals from the pulse generators WS1–WS4, and output signals from a yaw rate sensor YS which detects the yaw rate of the vehicle. The CPU reads the levels of the output signals in the form of converted digital data.

The pressure detection signal of the pressure switch PH switches from a low level L indicative of high pressure, to a high level H indicative of low pressure, when the accumulator pressure decreases to a pressure P3. When the accumulator pressure rises to a pressure P4, the pressure detection signal from the pressure switch PH switches from the high level H indicating low pressure to the low level L indicating high pressure.

The yaw rate sensor YS detects a changing speed of the vehicle rotational angle (yaw angle) with respect to a vehicle axis passing through the vehicle's gravity center (i.e., the yaw angle rate or yaw rate), and outputs to the electronic control unit ECU an electric signal indicating the yaw rate. In response, the CPU outputs a relay-on signal (for energizing the motor to drive the pump, or a relay-off signal for turning off the motor to stop the pump) from the output ports OPT to a relay driver RD. While the relay-on signal continues, the relay driver RD continues to supply electricity to the coil of a relay RY. The contacts of the relay RY are thereby closed to supply electricity to the electric motor M. The CPU also outputs a control signal from the output port OPT to solenoid drivers that energize solenoid valves (12 valves) of the brake fluid pressure circuit PC and outputs a control signal for the throttle control device TH, to a motor driver ACT provided for an electric motor that operates the sub-throttle MT of the throttle control device TH.

The ROM of the microcomputer CMP stores control programs for executing various operations described below and data such as fixed constants and the like. The CPU executes the programs while an operating voltage is being supplied thereto from a power circuit (not shown) which is started when an ignition switch (not shown) is closed. The RAM temporarily stores programs read from the ROM, data from the ROM, data inputted through the input ports, and data generated by the CPU.

An energizing circuit for the motor M has a current-detection resistor R that generates a voltage proportional to the value of current flowing through the motor M. The voltage is inputted to the A/D converting port of the CPU via the input port. The CPU reads the voltage in the form of digitally converted data (motor current data) when it is necessary to refer to the value of motor current.

Figure 2:
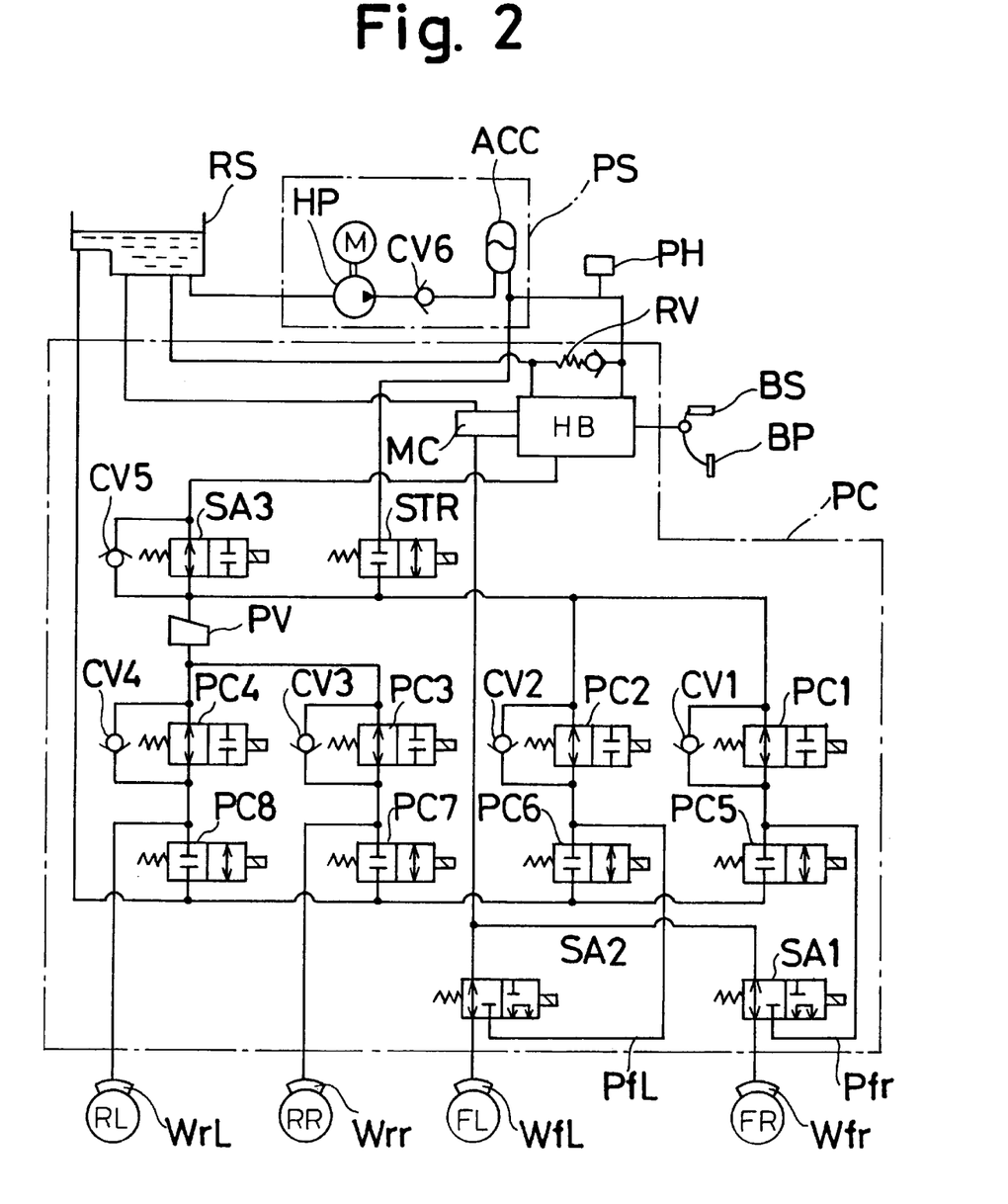
FIG. 2 is a schematic illustration of the brake fluid circuit PC used in the wheel brake pressure control apparatus shown in FIG. 1.

FIG. 2 shows the construction of the brake fluid pressure circuit PC. When the brake pedal BP is depressed, a hydraulic booster HB generates a pressure substantially proportional to the depressing pressure, thereby driving the piston of a master cylinder MC. The hydraulic booster HB is connected to a fluid pressure source PS. The fluid pressure source PS is formed of a fluid pressure pump HP, the drive motor M, an accumulator ACC and an electronic control device ECU. A relief valve RV is disposed between the accumulator ACC and a low pressure reservoir RS.

The fluid pressure pump HP is driven by the electric motor M to draw brake fluid from the low pressure reservoir RS to pressurize the fluid and send it to the accumulator ACC via a check valve CV6. The CPU monitors the ON/OFF (high pressure/low pressure) of the pressure switch PH for detecting the pressure in the accumulator ACC or in the pressure supply line connected to the accumulator ACC. When the pressure switch PH switches from the on-state to the off-state, the CPU drives the electric motor M through the relay driver RD to thereby increase the fluid pressure in the accumulator ACC.

The CPU stops driving the electric motor M when the current Im flowing in the driving motor M reaches a value of current Ip (upper limit set value) corresponding to a pressure P5 (upper limit set value) that is higher than the pressure P4 at which the pressure detection signal of the pressure switch PH switches from the high level H (indicating low pressure) and the low level L (indicating high pressure).

If neither the pressure switch PH nor the current detecting circuit is experiencing an abnormality, the CPU continues the above-described driving control so that the fluid pressure in the accumulator ACC is maintained within the predetermined range of P3 to P5.

Solenoid changeover valves SA1, SA2 are disposed in respective front wheel-side fluid pressure circuits that extend between and connect the master cylinder MC and the front wheel cylinders WfR, WfL. The solenoid changeover valves SA1 is connected to solenoid on-off valves PC1, PC5 by a pressure control line PfR while the solenoid changeover valve SA2 is connected to solenoid on-off valves PC2, PC6 by a control pressure line PfL.

A solenoid on-off valve SA3 and a plurality of supply/discharge controlling solenoid on-off valves PC1–PC8 are disposed in fluid pressure lines extending between and connecting the hydraulic booster HB and the wheel cylinders WfR, WfL, WrR, WrL. The rear wheel-side fluid pressure circuit is provided with a proportional pressure reducing valve PV. Fluid pressure from the fluid pressure source PS is applied to the downstream side of the solenoid on-off valve SA3 via a solenoid on-off valve STR.

In the front wheel-side hydraulic system, the solenoid on-off valves PC1, PC2 are connected to the solenoid on-off valve STR. The solenoid on-off valve STR is a two-port two-position solenoid on-off valve that is normally closed to prevent flow when its electric coil is not energized (i.e., when the electric coil is not operated (OFF)). The solenoid on-off valve STR opens to allow flow when the electric coil is energized or operated (ON). When the solenoid on-off valve STR is open, the solenoid on-off valves PC1, PC2 communicate with the accumulator ACC.

The solenoid changeover valves SA1, SA2 are three-port two-position solenoid changeover valves. Each of the solenoid changeover valves SA1, SA2 assumes a first position as indicated in FIG. 2, when its electric coil is not energized or is not operated (OFF). In this state, the corresponding front wheel cylinder WfR or WfL communicates with the master cylinder MC. When the electric coil associated with the respective solenoid changeover valves SA1, SA2 is energized or rendered operational (ON), the solenoid changeover valve switches to a second position so that the corresponding wheel cylinder WfR, WfL is disconnected from the master cylinder MC and instead communicates with the respective solenoid on-off valves PC1, PC5 or the solenoid on-off valves PC2, PC6.

Check valves CV1, CV2 are connected in parallel to a respective one of the solenoid on-off valves PC1, PC2. The flow-in side of the check valve CV1 is connected to the control pressure line PfR while the flow-in side of the check valve CV2 is connected to the control pressure line PfL. The check valve CV1 is provided to cause the brake fluid pressure in the front right wheel cylinder WfR to quickly follow a decrease of the output pressure of the hydraulic booster HB when the brake pedal BP is released while the solenoid changeover valve SA1 is ON (in the second position). That is, the check valve CVI allows brake fluid to flow toward the hydraulic booster HB but prevents it from flowing in the opposite direction. Likewise, the check valve CV2, provided on the front left wheel cylinder WfL prevents reverse flow by allowing brake fluid to flow toward the hydraulic booster HB but preventing it from flowing in the opposite direction.

The solenoid on-off valve SA3 in the rear wheel-side hydraulic system is a two-port two-position solenoid on-off valve that is opened to allow flow in the position shown in FIG. 2 when its electric coil is not energized or is not operated (OFF). In this state of the solenoid on-off valve SA3, the solenoid on-off valves PC3, PC4 communicate with the hydraulic booster HB via the proportional pressure reducing valve PV. In this state, the solenoid on-off valve STR is closed (OFF) as shown in FIG. 2 so that the proportional pressure reducing valve PV is disconnected from the accumulator ACC. When the solenoid on-off valve SA3 is turned on to close and thereby prevent flow, the solenoid on-off valves PC3, PC4 are disconnected from the hydraulic booster HB and connected to the solenoid on-off valve STR via the proportional pressure reducing valve PV. When the solenoid on-off valve STR is subsequently turned on to allow flow, the solenoid on-off valves PC3, PC4 communicate with the accumulator ACC.

A pair of check valves CV3, CV4 is provided and each one is connected in parallel to a respective one of the solenoid on-off valves PC3, PC4. The flow-in side of the check valve CV3 is connected to the wheel cylinder WrR while the flow-in side of the check valve CV4 is connected to the wheel cylinder WrL. The check valves CV3, CV4 are provided to cause the brake fluid pressure of the wheel cylinders WrP, WrL to quickly follow a decrease of the output pressure of the hydraulic booster HB when the brake pedal BP is released. That is, the check valves CV3, CV4 allow brake fluid to flow toward the solenoid on-off valve SA3 but prevent it from flowing in the opposite direction. Another check valve CV5 is connected in parallel to-the solenoid on-off valve SA3 so that a further depression of the brake pedal BP will provide an increase in the wheel brake pressure even when the solenoid on-off valve SA3 is on in the flow preventing position.

The solenoid changeover valves SA1, SA2, the solenoid on-off valves SA3, STR, and the solenoid on-off valves PC1–PC8 are on-off-controlled by the electronic control unit ECU. For example, during brake steering control (wheel brake pressure distribution control) that is performed while the brake pedal BP is not operated, the solenoid changeover valves SA1, SA2 are switched on (to the second position), the solenoid on-off valve SA3 is switched on to prevent flow, and the solenoid on-off valve STR is switched on to allow flow, because no brake fluid pressure is outputted from either the hydraulic booster HB or the master cylinder MC during the control. A circuit connection state is thereby established in which the fluid pressure in the accumulator ACC of the fluid pressure source PS can be supplied to the wheel cylinders WfR, Wfl, WrR, WrL, via the solenoid on-off valve STR and the opened solenoid on-off valves PC1–PC8. Therefore, the brake fluid pressure can be controlled for quick pressure increase, pulse pressure increase (gradual increase), pressure hold (maintained pressure), pulse pressure decrease (gradual decrease), quick pressure decrease and the like, by repeatedly switching the solenoid on-off valves PC1–PC8 on and off and varying the off-duty ratio of the on-off repetition (the ratio of the off-time to an on-off cycle).

The foregoing will be explained with respect to the solenoid on-off valves PC1, PC5 for controlling the wheel brake pressure in the front right wheel WfR. When the valve PC1 is in the off state to allow flow, and the valve PC5 is in the off state to prevent flow, the wheel brake pressure in the front right wheel WfR increases. If the off-duty ratio to the on-off cycle is set to 100%, a continuously maintained off-state is established in which a typical quick pressure increase is achieved. If the off-duty ratio is set to 0%, a continuously maintained on-state is established in which the valve PC1 is on to prevent flow and the valve PC5 is on to allow flow. In this state, the wheel brake pressure in the front right wheel WfR returns to the reservoir RS through the valve PC5, thereby achieving a typical quick pressure decrease. Based on the 100% off-duty ratio achieving a quick pressure increase and the 0% off-duty ratio (i.e., on-duty ratio of 100%) achieving a quick pressure decrease, it can be simply assumed that off-duty ratios equal to or greater than 50% but less than 100% achieve pulse pressure increases (gradual increases), and off-duty ratios less than 50% but greater than 0% achieve pulse pressure decreases (gradual decreases). The pressure hold can be achieved by the valve PC1 being in the on state to prevent flow and the valve PC5 being in the off state to prevent flow.

In this embodiment, however, reference off-duty ratios are predetermined in one-to-one correspondence to the pressure operations, that is the quick pressure increase, the pulse pressure increase (gradual increase), the pulse pressure decrease (gradual decrease) and the quick pressure decrease. During the wheel brake pressure control, the CPU determines a single mode for the quick pressure increase, the pulse pressure increase (gradual increase), the pressure hold (maintained pressure), the pulse pressure decrease (gradual decrease) or the quick pressure decrease. The CPU then more finely corrects the reference off-duty ratio (a single value) pre-assigned for the mode selected for one of the pressure operations to determine a final off-duty ratio to be used. In accordance with the thus-determined off-duty ratio, the CPU controls the on-off condition of the solenoid on-off valve PC1 for increasing pressure and controls the on-off condition of the solenoid on-off valve PC5 for reducing pressure. By way of example, in the quick pressure increase mode or the pulse pressure increase mode, the CPU on-off-controls the pressure-increasing solenoid on-off valve PC1 and keeps the pressure-reducing solenoid on-off valve PC5 off so that the valve continuously prevents flow. In the quick pressure decrease mode or the pulse pressure decrease mode, the CPU maintains the pressure-increasing solenoid on-off valve PC1 in the on state so that the valve continuously prevents flow while also on-off-controlling the pressure-reducing solenoid on-off valve PC5. In the pressure hold mode, the CPU maintains the solenoid on-off valve PC1 in the on state so that the valve continuously prevents flow and also maintains the solenoid on-off valve PC5 in the off state so that the valve continuously prevents flow.

In manner similar to that described above, the CPU controls the pressure-increasing solenoid on-off valve PC2 and the pressure-reducing solenoid on-off valve PC6 for the front left wheel cylinder, controls the pressure-increasing solenoid on-off valve PC3 and the pressure-reducing solenoid on-off valve PC7 for the rear right wheel cylinder, and controls the pressure-increasing solenoid on-off valve PC4 and the pressure-reducing solenoid on-off valve PC8 for the rear left wheel cylinder.

Figure 3:
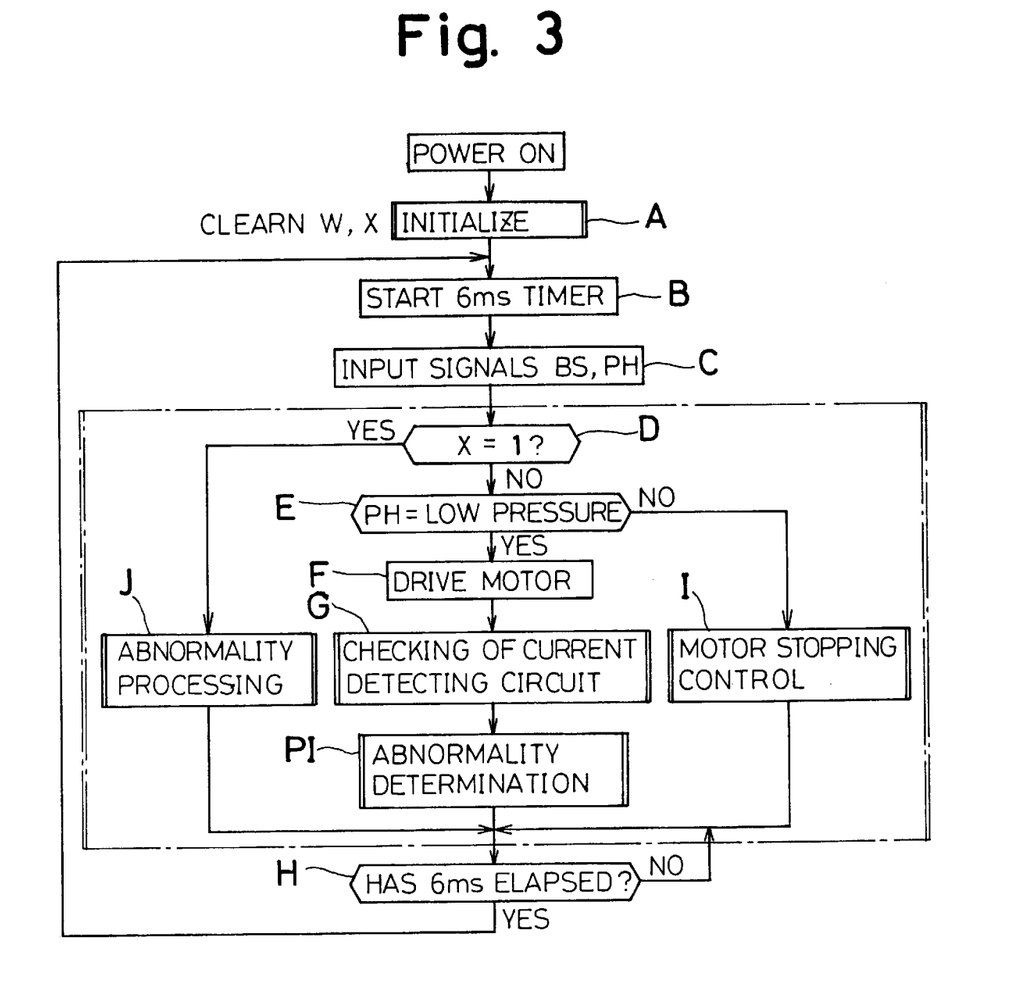
FIG. 3 is a flowchart illustrating operation of the CPU of the electronic control unit shown in FIG. 1, the operation being related to accumulator pressure control.

FIG. 3 illustrates the pump driving control operation of the CPU of the microcomputer CMP of the electronic control device (ECU) shown in FIG. 1. When powered on, the CPU performs an initial setting in accordance with the system program in step A. During the initial setting in step A, the various registers N, W and X described below are cleared.

Subsequently, the CPU starts a 6 ms. timer in step B, and then reads the detection signal from the pressure switch PH and the brake pedal depression signal from the brake switch BS in step C. With respect to the brake pedal depression signal, a high signal level H indicates release of the pedal while a low signal level L indicates depression of the brake pedal. The CPU then performs motor control in steps D, E, F, G, I, J, PI. Then the CPU waits for the 6 ms. timer to time out in step H. When the time has elapsed, the CPU performs steps B, C and the motor control steps D–J, PI again in the same sequence. That is, the procedure through steps B, C and the motor control steps D–G, I, J, PI is repeated in the 6 ms. cycle.

With respect to the various motor control operations, in step D the CPU checks whether the data in the register X is "1",thereby indicating a failure in the motor current detecting system and/or a failure in the pressure switch PH. If the data is not "1", the program proceeds to step E where the CPU checks whether the pressure detection signal from the pressure switch PH indicates low pressure (i.e, the signal is at the high level H).

If the pressure detection signal indicates low pressure (the signal is at the high level H), the CPU drives the motor M in step F, and then proceeds to step G where a check of the current detecting circuit is performed. After the check of the current detecting circuit is performed in step F, an abnormality determination is performed in step PI. In the abnormality determination of step PI, the CPU determines whether there is an accumulator low pressure abnormality or a motor abnormality on the basis of the value of current flowing in the motor M. The abnormality determination will be discussed in more detail below.

Figure 4:
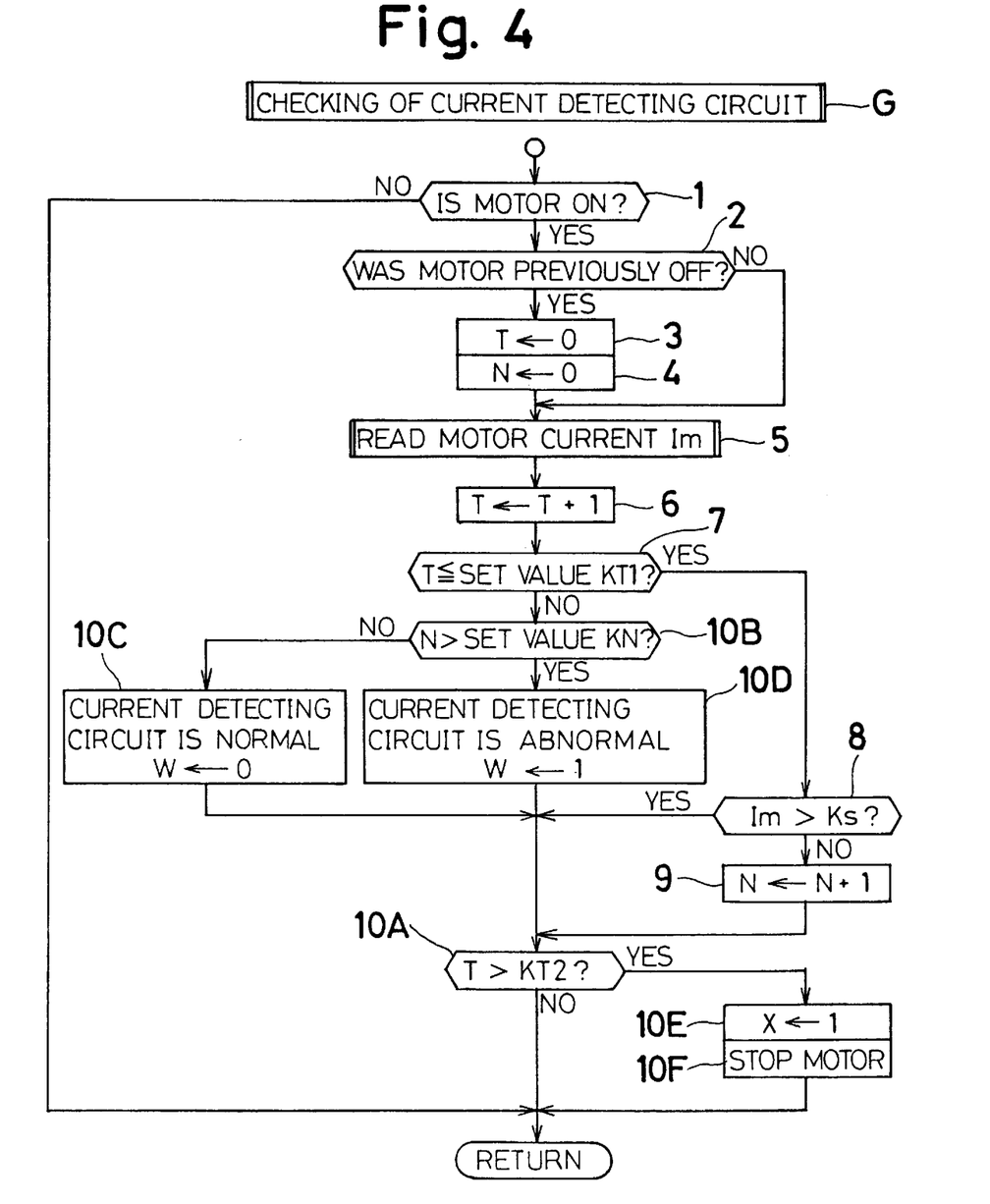
FIG. 4 is a flowchart illustrating the subroutine of the main routine shown in FIG. 3 for checking the current detecting circuit.

FIG. 4 illustrates the subroutine that is performed in connection with the check of the current detecting circuit that is carried out in step G of FIG. 3. This checking operation is performed in the 6 ms. cycle as long as the data of the register X is "0" and the pressure detection signal is at the high level H indicating low pressure. In step 1 of the subroutine shown in FIG. 4, a determination is made as to whether the motor M is presently on (i.e., whether the pump is being driven). If the motor M is on, the program proceeds to step 2 where it is determined whether the motor M was off (i.e., the pump was stopped) in the previous cycle (the 6 ms. before). If the motor M is judged to be on in the present cycle but was off in the previous cycle, this means that the motor M has just been started. Therefore, a register T for counting the time T that has elapsed after the start of the driving operation of the motor M is cleared in step 3, and a register N for counting the number of motor current detection errors is cleared in step 4. The CPU then reads a present motor current value Im in step 5.

The time count value T of the register T is incremented by 1 in step 6. As long as the elapsed time T does not exceed a first set length of time KTI which is determined in step 7, the program proceeds to step 8. Here, it is determined whether the motor current value Im is greater than a first set value Ks. If the motor current value Im is not greater than the first set value Ks, the register N is incremented by one in step 9.

The first set length of time KT1 is slightly longer than a starting time required until the current Im in the motor M becomes stable at a value corresponding to a load (the accumulator pressure) after the motor M has been started. Therefore, if the entire electric current detecting circuit system is normal, including the motor current detecting resistor and the motor energizing circuit of the relay driver RD, the circuit elements provided between the motor current detecting resistor R and the input of the A/D-converted data into the CPU, the motor current value Im read by the CPU is greater than the first set value Ks and so the data in the register N is not incremented. Conversely, if the electric current detecting circuit system is experiencing an abnormality such that the motor current value Im read by the CPU does not indicate the actual current value, the data of the register N is incremented in the 6 ms. cycle until the first set length of time KTI elapses in steps 7, 8 and 9.

If the elapsed time T exceeds the first set length of time KT1 in step 7, the CPU checks whether the value N indicated by the data in the register N exceeds a set value KN in step 10B. If the value N exceeds the set value KN, the CPU writes "1" (circuit abnormality information) into the register W indicating an abnormality in the current detecting circuit system, stops driving the motor M, and outputs an alarm indicating a current detecting circuit abnormality in step 10D. If the value N is equal to or less than the set value KN, the CPU clears the register W and discontinues the alarm indicating a current detecting circuit abnormality in step 10C.

In step 10A, a determination is made as to whether the elapsed time T exceeds a second set length of time KT2. If so, in step 10E the CPU writes "1" (pressure detection abnormality information) into the register X indicating an abnormality in the pressure detecting system, and outputs an alarm indicating a pressure detecting circuit abnormality. Thereafter, in step 10F, the CPU stops driving the motor M. The second set length of time KT2 is slightly longer than a pump driving time required to increase the accumulator pressure from P3 to P5.

If everything is normal, the indication of the pressure detection signal from the pressure switch PH switches from low pressure (the high signal level H) to high pressure (the low signal level L) when the accumulator pressure rises to P4 (P4<P5). In response, the CPU proceeds from step E to step I in FIG. 3, instead of proceeding to check the current detecting circuit in step G. Therefore, steps 10A, 10E, 10F associated with the checking of the current detecting circuit shown in FIG. 4 are not performed.

If an abnormality occurs such that the pressure detection signal from the pressure switch PH will not switch from the high level H (indicating low pressure) to the low level L (indicating high pressure), the CPU writes "1" (pressure detection abnormality information) into the register X indicating an abnormality in the pressure detecting system and outputs an alarm indicating a pressure detecting circuit abnormality in step 10E following step 10A, as described above. Subsequently, the CPU stops driving the motor M in step 10F.

Figure 5:
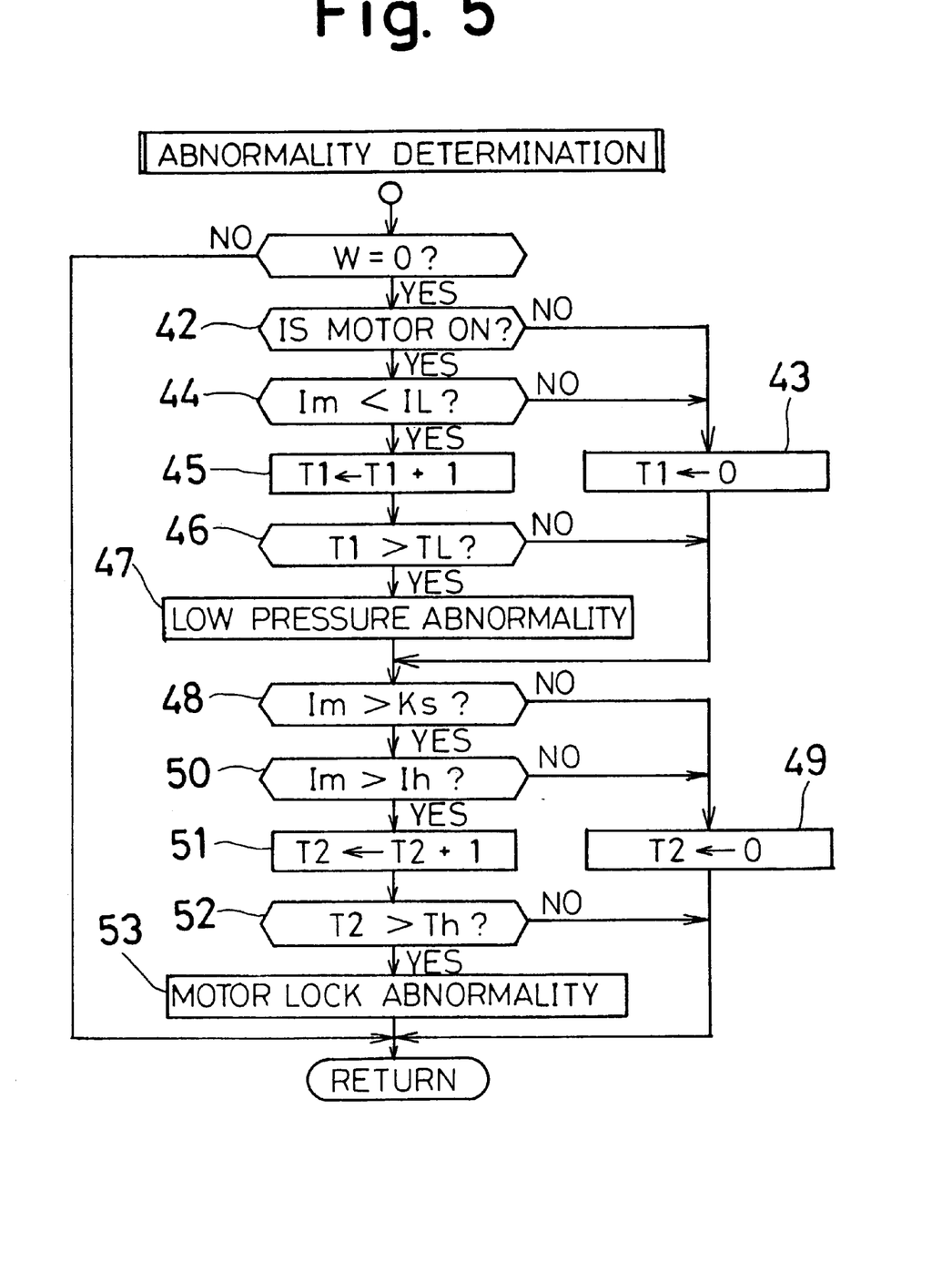
FIG. 5 is a flowchart illustrating the subroutine of the main routine shown in FIG. 3 for performing the abnormality determination.

FIG. 5 illustrates the subroutine that is carried in connection with the abnormality determination of step P1 of FIG. 3. In step 41 of FIG. 5, the CPU refers to the content of the register W resulting from the check of the current detecting circuit of step G of FIG. 1. If the content of register W is "0", thereby indicating that the current detecting circuit is normal, the operation proceeds to step 42 where it is determined whether the motor is on. Conversely, if the content of the register W is "1", thereby indicating that the current detecting circuit is abnormal, the operation returns without performing the abnormality determining operation.

If it is determined in step 42 that the motor is on, the CPU reads the motor current value Im and compares it with a predetermined lower limit value IL in step 44. If the motor current value Im is less than the lower limit value IL, the CPU increments the elapsed time counter T1 in step 45. If the motor current value Im is not less than the lower limit value IL, the CPU resets the elapsed time counter T1 in step 43, and then proceeds to step 48.

If it is determined in step 44 that the motor current value Im is less than the lower limit value IL and after the elapsed time counter T1 is incremented, the program proceeds to step 46 where the CPU determines whether the time indicated by the elapsed time counter T1 has exceeded a predetermined length of time TL. If the elapsed time has not exceeded the predetermined length of time TL, the CPU proceeds to step 48. If the elapsed time has exceeded the predetermined length of time TL, the CPU determines in step 47 that there is a low pressure abnormality. That is, if the motor current value Im continues to be less than the predetermined lower limit value IL for more than the predetermined length of time TL, the CPU determines that there is at least one of an accumulator low pressure abnormality or a motor racing abnormality.

The program then proceeds to step 48 where the CPU determines whether the motor current value Im is greater than the first set value Ks. If the motor current value Im is not greater than the first set value Ks, an elapsed time counter T2 is reset in step 49, and the operation returns. If the motor current value Im is greater than the first set value Ks, the CPU compares the motor current value Im with a predetermined upper limit value Ih in step 50. If the motor current value Im is greater than the upper limit value Ih, the CPU increments the elapsed time counter T2 in step 51. If the motor current value Im is not greater than the upper limit value Ih, the elapsed time counter T2 is reset in step 49, and the operation returns.

After step 51, the CPU determines in step 52 whether the time indicated by the elapsed time counter T2 has exceeded a predetermined length of time Th. If the elapsed time has not exceeded the predetermined length of time Th, the operation returns. If the time indicated by the elapsed time counter T2 has exceeded the predetermined length of time Th, the CPU determines in step 53 that there is a motor lock abnormality. In short, if the motor current value Im continues to be greater than the upper limit value Ih for more than the predetermined length of time Th, the CPU determines that there is a motor lock abnormality.

Referring back to FIG. 3, if the contents of the register X is "1" in step D (i.e., the register contains pressure detection abnormality information), the CPU performs an abnormality processing in step J. The content of the abnormality processing will be detailed below with reference to the flowchart of FIG. 7.

If it is determined that the contents of the register X is not "1", the program proceeds to step E. If the indication of the pressure detection signal from the pressure switch PH switches from low pressure (the high signal level H) to high pressure (the low signal level L) (i.e., if the accumulator pressure becomes P4 or higher) while the contents of the register X is "O", the CPU performs motor stopping control in step I. The subroutine for the motor stopping control is illustrated in the flowchart of FIG. 6.

Figure 6:
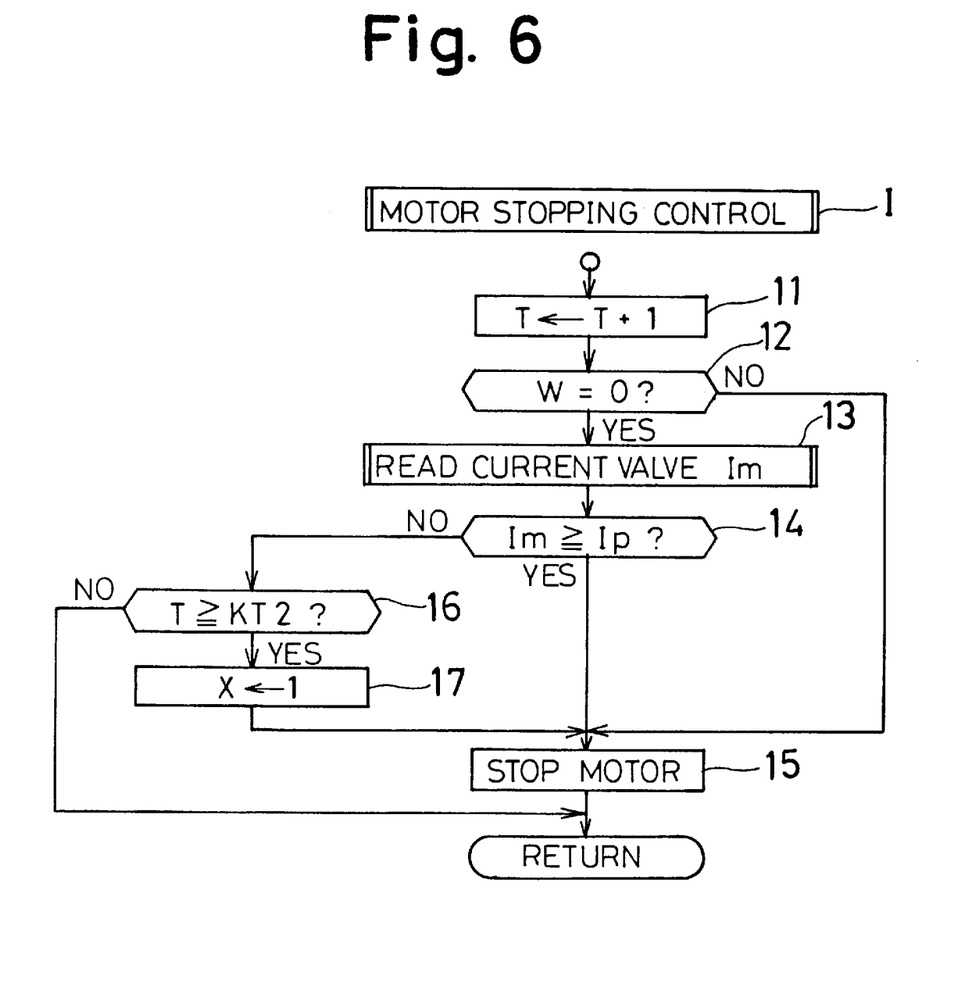
FIG. 6 is a flowchart illustrating the subroutine of the main routine shown in FIG. 3 for motor stopping control.

Referring to FIG. 6, in the motor stopping control of step I, the CPU proceeds to step 11 and increments by 1 the data of the register T for counting the time elapsed after the start of the driving of the motor M. The CPU checks in step 12 whether the current detecting circuit abnormality is absent (i.e., whether the contents in the register W is "O"). If the current detecting circuit abnormality is absent, the CPU reads the motor current value Im in step 13, and determines in step 14 whether the motor current value Im is equal to or greater than the second set value Ip (i.e., the value corresponding to the accumulator pressure P5). If so, the CPU stops the motor in step 15. If the elapsed time T exceeds the second set length of time KT2 while the motor current value Im is less than the second set value Ip (steps 14, 16), the CPU writes "1" into the register X indicating an abnormality in the pressure detecting system, and outputs an alarm indicating a pressure detecting circuit abnormality in step 17. Subsequently, the CPU stops the motor in step 15.

Figure 7:
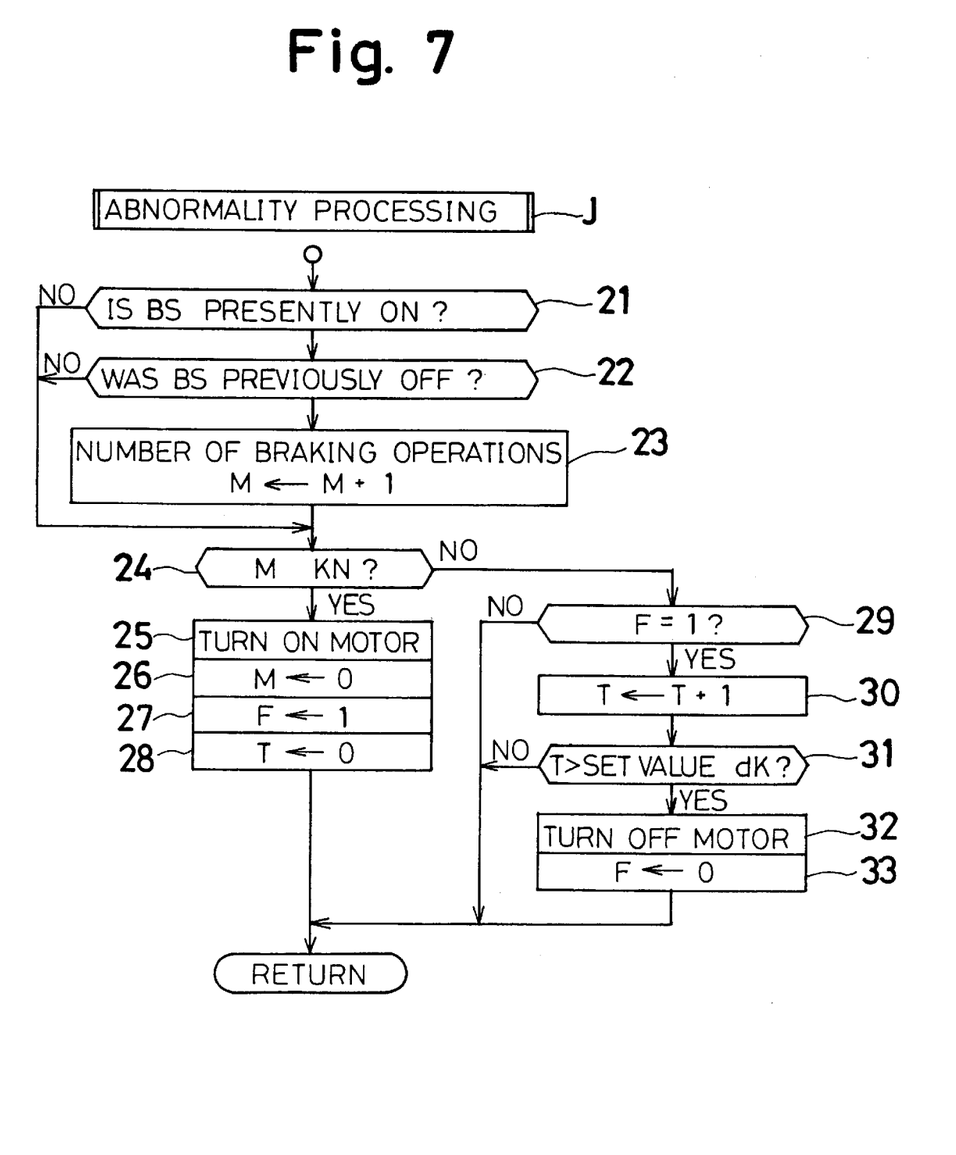
FIG. 7 is a flowchart illustrating the subroutine of the main routine shown in FIG. 3 for the abnormality processing.

The subroutine for abnormality processing in step J of FIG. 1 that is performed by the CPU while the pressure detection abnormality information "1" is held in the register X will be described with reference to FIG. 7. At step 21, if the signal from the brake switch BS is at the low level L (indicating that the brake pedal is depressed), the CPU checks in step 22 whether the signal BS was at the high level H (indicating that the brake pedal was not depressed) in the previous cycle. If so, it means that the brake pedal has just been depressed, that is there is a new braking depressing operation. Then, in step 23, the CPU increments by 1 the data in a register M for counting the number of braking operations. If the signal BS was also at the low level L in the previous cycle, it means that the depression of the brake pedal has been continuing and, therefore, the number M of brake pedal depressing operations was already incremented by 1 when the brake pedal was depressed from the released state. Therefore, the register M for counting the number of braking actions is not incremented in the present cycle. Because the contents of the register M (i.e., the number of brake depressing actions) is cleared when the energization or driving of the motor M is started (steps 25, 26), the data in the register M indicates the number of timings that the brake pedal is depressed after the driving of the pump has been started.

If the number M of brake pedal depressing operations exceeds a fixed value KM in step 24, the CPU turns on the motor M in step 25, and clears the register M in step 26. In step 27, the CPU writes "1" into a register F indicating a pump driving operation at the time of a pressure detection abnormality. Subsequently, in step 28, the CPU clears the register T. Because the value of the register M was cleared in step 26 immediately after the motor M was turned on, the number M of brake pedal depressing actions remains 0 or a small number for some time. Therefore, in the next cycle and later cycles, the CPU proceeds from step 24 to step 29, and then to step 30 where the data of the register T for counting the time T elapsed after the start of operating the motor M is incremented by 1.

In step 31, it is determined whether the elapsed time T (more precisely, T×6 ms.) has exceeded a set length of time dK. If so, the CPU immediately turns off the motor M in step 32, and clears the register F in step 33. After that, the CPU operates the motor M for the set length of time Kd every time the number M of brake pedal depressing actions exceeds the fixed value KM. Therefore, a certain accumulator pressure is secured.

In this embodiment, when the set value KN is exceeded by the number N of motor current detection errors (i.e., the number N of times that a motor current value Im equal to or less than the first set value Ks is inputted to the CPU by the motor current reading operations repeated in the cycle of 6 ms, within the first set time KTI following the start of driving the motor M)the CPU writes "1" into the register W indicating a current detecting circuit abnormality.

While the data in the register W is "O", thereby indicating that the current detecting circuit is normal, the CPU drives the motor M when the pressure detection signal from the pressure switch PH switches from the low level L (indicating high pressure) to the high level H (indicating low pressure). The CPU stops driving the motor M when the motor current value Im reaches the second set value Ip after the pressure detection signal has switched from the high level H (indicating low pressure) to the low level L (indicating high pressure). The accumulator pressure is thereby maintained within the range of P3 to PS (step E in FIG. 3 and steps 11–15 in FIG. 6).

If the time T elapsing after the start of driving the motor M exceeds the second set length of time KT2 while the pressure detection signal remains at the high level H (indicating low pressure), the CPU writes "1" (i.e., pressure detection abnormality information) into the register X and stops driving the motor M (steps E, F in FIG. 3 and steps 10A, 10E in FIG. 4). Even in a case where the pressure detection signal has switched from the high level H (indicating low pressure) to the low level L (indicating high pressure), the CPU writes "1" (i.e., pressure detection abnormality information) into the register X and stops driving the motor M if the elapsed time T exceeds the second set length of time KT2 while the motor current value Im remains less than the second set value Ip (step E in FIG. 3 and steps 14, 16, 17, 15 in FIG. 6). In these cases, where the pressure detection abnormality information is generated, the driving of the motor is stopped when the accumulator pressure is at a level (corresponding to KT2) that is slightly higher than P5.

Furthermore, when the data in the register W is "0", the CPU performs the abnormality determination (step PI detailed in FIG. 5). During the abnormality determination, the CPU compares the motor current value Im with predetermined values. If the motor current value Im continues to be less than the predetermined lower limit value IL for more than the predetermined length of time TL, the CPU determines that there is a low pressure abnormality (steps 44, 46, 47 in FIG. 5). If the motor current value Im continues to be greater than the predetermined upper limit value Ih for more than the predetermined length of time Th, the CPU determines that there is a motor lock abnormality (steps 50, 52, 53 in FIG. 5).

If the data in the register W is "1", the CPU stops driving the motor M when the pressure detection signal from the pressure switch PH switches from the high level H (indicating low pressure) to the low level L (indicating high pressure) (step E in FIG. 3 and steps 12, 15 in FIG. 6). The accumulator pressure is thereby maintained within the range of P3–P4, which corresponds to the hysteresis width of the pressure switch PH.

If the contents of the register X is "1" (i.e., the register contains the pressure detection abnormality information), the number M of brake pedal depressing actions is cleared and the motor M is operated for the set length of time dK, every time the number M reaches the set value KM. The set length of time dK is a motor driving time required to increase the accumulator pressure by an amount that is equivalent to KM×a pressure reduction (estimated value) caused by a single brake pedal depressing action.

To summarize, the fluid pressure source apparatus of the present invention is defined by the fluid pump HP, the accumulator ACC, the pressure switch PH, the electric motor M for driving the fluid pump HP, and the motor control device ECU which drives the electric motor when the pressure switch detects a low pressure. A current detection device R detects the value of current of the electric motor and an abnormality determination device ECU determines an abnormality in either the accumulator or the electric motor based on the motor current value. The ECU also functions as a failure determination device for determining whether the motor current value of the electric motor occurring during a first set length of time (KT1) following the start of driving of the electric motor is greater than a first set value (Ks). If the value of current is not greater than the first set value (Ks), the ECU determines that the current detection device R is experiencing an abnormality.

When the pressure switch PH detects low pressure, the motor control device ECU turns on the electric motor M to drive the fluid pump HP so that the pressure in the accumulator ACC increases. When the pressure switch PH detects a high pressure, the motor control device ECU stops driving the electric motor M. The pressure detection signal from the pressure switch PH switches from the low level L indicative of high pressure to a high level H indicative of low pressure when the accumulator pressure decreases to a pressure P3. The pressure detection signal switches from the high level H indicative of low pressure to the low level L indicative of high pressure when the accumulator pressure rises to a pressure P4 (P4>P3). That is, the pressure switch has a hysteresis width of P4–P3.

The motor current detection device R detects an electric current (Im) flowing in the electric motor M which drives the fluid pump HP. The abnormality determination device ECU uses the detected motor current (Im) as a basis for determining the existence of an abnormality. If the value of the current (1 m) is abnormal, the ECU determines that one or both of the accumulator and the electric motor has an abnormality. For example, the ECU may determine that there is a motor lock abnormality if an excessively great motor current exceeding a predetermined upper limit value (Ih) (Im>Ih) continues to flow for at least a predetermined length of time (Th), and the ECU may determine that there is an accumulator low pressure abnormality or a motor racing abnormality if an excessively small motor current less than the predetermined lower limit value (IL) (Im<IL) continues to flow for at least another predetermined length of time (TL).

If an abnormality occurs in the motor current detection device (R) or in a circuit for reading the electric current detection signal from the motor current detection device R so that the detected value of current becomes a value (for example, zero) that is less than the actual value of the current, or a value that is greater than the actual value of the current, the abnormality determination device ECU may make a wrong determination. However, in the fluid pressure source apparatus of the present invention, the failure determination device ECU determines whether the motor current value of the motor M occurring during the first set length of time (KT1) following start of the driving of the electric motor M is greater than the first set value (Ks) and, if it is not greater than the first set value (Ks), determines that the motor current detection device R is experiencing an abnormality. Therefore, in the case of a failure of the motor current detection device R, appropriate countermeasures can be taken; for example, the abnormality determination device ECU may be stopped, or an alarm may be outputted.

Also in accordance with the present invention a relay driver RD is provided for energizing the electric motor. The failure determination device ECU determines whether the motor current value during a first set length of time (KTI) following start of driving of the electric motor is greater than a first set value (Ks). If the motor current value is not greater than the first set value (Ks), the failure determination device ECU generates circuit abnormality information (W=1) indicating that the value of current is not greater than the first set value (Ks). When the pressure switch detects the low pressure, the ECU drives the electric motor using the relay driver. If the motor current value (Im) reaches a second set value (Ip) while the circuit abnormality information is not generated (W=0), the motor control device ECU stops driving the electric motor.

When the pressure switch PH detects a low pressure, the motor control device ECU drives the electric motor M using the relay driver RD. When the motor current value (Im) reaches the second set value (Ip), the motor control device ECU stops driving the electric motor M. Because the motor current value (Im) becomes a value corresponding to the accumulator pressure after a starting time for the electric motor M elapses, the ECU stops driving the electric motor M when the accumulator reaches an upper limit value (a designed value being P5) corresponding to the second set value (Ip).

In a case where the pressure detection signal from the pressure switch PH switches from a low level L which is indicative of high pressure to a high level H which is indicative of low pressure when the accumulator pressure decreases to a pressure P3, and the pressure detection signal switches from the high level H (low pressure) to the low level L (high pressure) when the accumulator pressure rises to a pressure P4 (P4>P3), the provision of the second set value (Ip) corresponding to the pressure P5 (P5>P4) will achieve a hysteresis width (P5–P3) that is greater than the hysteresis width (P4–P3) of the pressure switch PH. That is, the accumulator pressure can be controlled within the increased hysteresis width (P5–P3).

In a construction where the driving of the electric motor is stopped if the motor current value (Im) reaches the second set value (Ip), if an abnormality occurs in the motor current detection device (R) or in the circuit for reading the electric current detection signal from the motor current detection device R so that the detected current value becomes a value (for example, zero) that is less than the actual current value, the driving of the electric motor may continue so that overpressure in the accumulator and overload on the electric motor may result. However, in the fluid pressure source apparatus of the present invention, the failure determination device ECU determines whether the value of motor current value occurring during the first set length of time (KT1) following start of driving of the electric motor is greater than the first set value (Ks) and, if the current value is not greater than the first set value (Ks), generates circuit abnormality information (W=1) indicating that the value of current is not greater than the first set value. Therefore, an abnormality occurring in the motor current detection device R or in the circuit for reading the electric current detection signal can be detected. Further, based on the circuit abnormality information (W=1), an appropriate countermeasure can be taken; for example, an alarm is outputted, or the driving of the motor is stopped, or other similar action.

The motor control device ECU may stop driving the electric motor M when the pressure switch PH detects the high pressure circuit while the circuit abnormality information is present (W=1) (as in steps 12, 15 in FIG. 6). With this optional construction of the invention, if the pressure detection signal indication of the pressure switch PE switches from high pressure to low pressure while the circuit abnormality information is present (W=1), the electric motor M is driven. The driving of the electric motor M is stopped when the pressure detection signal switches from the low pressure to the high pressure. Therefore, a certain accumulator pressure is secured, although the accumulator pressure control range is reduced to the range of P3 to P4, that is the hysteresis width of the pressure switch PH.

According to the construction described above, the electric motor M is driven when the pressure detection signal from the pressure switch PH indicates low pressure (i.e., when at the high signal level H), and the driving of the electric motor M is stopped when the motor current value (Im) reaches the second set value (Ip) after the pressure detection signal from the pressure switch PH switches to indicate the high pressure (i.e., switches to the low signal level L), as long as the circuit abnormality information is not present (W=1). In this way, the accumulator pressure is controlled within the increased range of P3 to P5. However, if the pressure switch PH should fail, that is become unable to switch to output the pressure detection signal indicating the high pressure condition (the low signal level L), the driving of the electric motor M will continue even if it needs to be stopped. In addition, detection of an abnormality in the motor current detection device R is performed during the first set length of time (KT1) following start of driving the electric motor. Therefore, if an abnormality occurs in the motor current detection device R (for example, the detection value becomes zero due to a short circuit) after the lapse of the first set length of time (KTI), the driving of the electric motor will continue since the motor current detection value (Im) does not reach the second set value (Ip).

To prevent the undesired events described above, the motor control device ECU may stop driving the electric motor M when the time (T) elapsing after the start of driving of the electric motor M becomes equal to or longer than a second set length of time (KT2) that is longer than the first set length of time (KT1) (as in steps 10A, 10E, 10F in FIG. 4 and steps 15, 16, 17 in FIG. 6).

In a case where the driving of the electric motor M is stopped because the time (T) elapsing after start of driving the electric motor becomes equal to or longer than the second set length of time (KT2), a pressure detection abnormality can be suspected, such as a failure of the motor current detection device R that has disabled the device R from detecting a motor current value corresponding to the accumulator pressure, or a failure of the pressure switch PH that has disabled the switch PH from switching the detection signal from the high signal level H (indicating low pressure) to the low signal level L (indicating high pressure). As a countermeasure to such possible abnormalities, the motor control device ECU may generate pressure detection abnormality information (X=1) when the time (T) elapsing after start of driving of the electric motor becomes equal to or longer than the second set length of time (KT2). While the pressure detection abnormality information is present (X=1), the motor control device ECU calculates an estimate of pressure reduction resulting from a fluid pressure consumption by a fluid pressure circuit connected to the accumulator. If the estimate of pressure reduction exceeds a set value (KM), the motor control device ECU drives the electric motor M for a third set length of time (dK) using the relay driver RD. Therefore, a certain accumulator pressure is secured and overpressure in the accumulator is avoided even when the motor current detection device R and/or the pressure switch PH has failed.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A fluid pressure source apparatus comprising:

a fluid pump;

an accumulator for receiving pressure from the fluid pump;

a pressure switch for detecting a pressure in the accumulator;

an electric motor for driving the fluid pump;

motor control means for driving the electric motor when the pressure switch detects low pressure in the accumulator;

current detection means for detecting a motor current value of the electric motor;

abnormality determination means for determining, based on the motor current value of the electric motor determined by the current detection means, whether at least one of the accumulator and the electric motor are experiencing an abnormality; and failure determination means for determining whether the motor current value of the electric motor occurring during a first set length of time following start of driving of the electric motor is greater than a first set value, and for determining the existence of an abnormality in the current detection means when the motor current value of the electric motor is not greater than the first set value, the abnormality determination means determining whether at least one of the accumulator and the electric motor is experiencing an abnormality based on the motor current value of the electric motor only when it is determined by said failure determination means that the current detection means is normal.

2. A fluid pressure source apparatus according to claim 1, wherein, if the motor current value of the electric motor continues to be less than a predetermined lower limit value for at least a predetermined length of time, the abnormality determination means determines that there is an accumulator low pressure abnormality or a motor racing abnormality.

3. A fluid pressure source apparatus according to claim 1, wherein, if the motor current value of the electric motor continues to be greater than a predetermined upper limit value for at least a predetermined length of time, the abnormality determination means determines that there is a motor locked abnormality.

4. A fluid pressure source apparatus comprising:

a fluid pump;

an accumulator for receiving fluid pressure from the fluid pump;

a pressure switch for detecting pressure in the accumulator;

an electric motor for driving the fluid pump;

a relay driver for energizing the electric motor;

motor current detection means for detecting a motor current value of the electric motor;

failure determination means for determining whether the motor current value of the electric motor during a first set length of time following start of driving of the electric motor is greater than a first set value, and for generating circuit abnormality information if the motor current value of the electric motor is not greater than the first set value; and motor control means for driving the electric motor using the relay driver when the pressure switch detects low pressure, for stopping driving the electric motor if the motor current value of the electric motor reaches a second set value while the circuit abnormality information is not generated, and for stopping driving the electric motor if the circuit abnormality information is generated and the pressure switch detects a high pressure.

5. A fluid pressure source apparatus according to claim 4, wherein when the time elapsed after start of driving of the electric motor becomes equal to or greater than a second set length of time that is greater than the first set length of time, the motor control means stops driving the electric motor.

6. A fluid pressure source apparatus according to claim 5, wherein when the time elapsed after start of driving of the electric motor becomes equal to or greater than the second set length of time, the motor control means generates pressure detection abnormality information.

7. A fluid pressure source apparatus according to claim 6, wherein when the pressure detection abnormality information is present, the motor control means calculates an estimate of pressure reduction resulting from fluid pressure consumption by a fluid pressure circuit connected to the accumulator and, if the estimate of pressure reduction exceeds a set value, the motor control means drives the electric motor for a third set length of time using the relay driver.

8. A fluid pressure source apparatus comprising:

a fluid pump;

an accumulator for receiving pressure from the fluid pump;

a pressure switch for detecting a pressure in the accumulator;

an electric motor for driving the fluid pump;

motor control means for driving the electric motor when the pressure switch detects low pressure in the accumulator and for stopping driving of the electric motor when the pressure switch detects high pressure in the accumulator;

current detection means for detecting a motor current value of the electric motor;

abnormality determination means for determining an existence of an abnormality in either the accumulator or the electric motor based on the motor current value determined by the current detection means; and failure determination means for determining the existence of an abnormality in the current detection means, the abnormality determination means determining whether at least one of the accumulator and the electric motor is experiencing an abnormality based on the motor current value of the electric motor only when it is determined by said failure determination means that the current detection means is normal.

9. A fluid pressure source apparatus according to claim 8, wherein, if the motor current value of the electric motor continues to be less than a predetermined lower limit value for at least a predetermined length of time, the abnormality determination means determines that there is an accumulator low pressure abnormality or a motor racing abnormality.

10. A fluid pressure source apparatus according to claim 8, wherein, if the motor current value of the electric motor continues to be greater than a predetermined upper limit value for at least a predetermined length of time, the abnormality determination means determines that there is a motor locked abnormality.

11. A fluid pressure source apparatus according to claim 8, wherein said failure determination means determines the existence of an abnormality in the current detection means based on a comparison of the motor current value with a predetermined value.

* * * * *